United States Patent [19]
Yokota et al.

[11] Patent Number: 5,642,752
[45] Date of Patent: Jul. 1, 1997

[54] CONTROLLABLE CONSTANT FLOW REGULATING LIFT VALVE

[75] Inventors: Hiroshi Yokota; Shingo Yokota; Kunio Ogura, all of Hiroshima, Japan

[73] Assignee: Kabushiki Kaisha Yokota Seisakusho, Hiroshima-Ken, Japan

[21] Appl. No.: 578,648

[22] PCT Filed: Aug. 19, 1994

[86] PCT No.: PCT/JP94/01372

§ 371 Date: Jan. 16, 1996

§ 102(e) Date: Jan. 16, 1996

[87] PCT Pub. No.: WO95/06214

PCT Pub. Date: Mar. 2, 1995

[30] Foreign Application Priority Data

Aug. 23, 1993 [JP] Japan ..................... 5-207702
Dec. 3, 1993 [JP] Japan ..................... 5-304144

[51] Int. Cl.$^6$ .................................. F16K 17/30
[52] U.S. Cl. ..................... 137/413; 137/500; 137/501
[58] Field of Search .......................... 137/500, 501, 137/503, 412, 413

[56] References Cited

U.S. PATENT DOCUMENTS

| | | | |
|---|---|---|---|
| 3,115,891 | 12/1963 | Kimm | 137/503 X |
| 3,344,805 | 10/1967 | Wapner | 137/501 X |
| 3,428,080 | 2/1969 | Brown | 137/501 |
| 4,250,915 | 2/1981 | Rikuta | 137/501 |
| 4,830,042 | 5/1989 | Cho | 137/413 X |
| 4,967,789 | 11/1990 | Kypris | 137/413 |

FOREIGN PATENT DOCUMENTS

| | | |
|---|---|---|
| 63-199984 | 4/1988 | Japan. |
| 2-81970 | 6/1990 | Japan. |
| 3-244881 | 10/1991 | Japan. |

Primary Examiner—Stephen M. Hepperle
Attorney, Agent, or Firm—Ladas & Parry

[57] ABSTRACT

The present invention relates to a controllable constant flow regulating lift valve of a direct-acting automat ic control type that operates on an operating force derived from the condition of a working fluid, such as valve-inlet pressure prevailing in the inlet passage, valve-outlet pressure prevailing in the outlet passage, variation of liquid level on the side of the outlet and so on. The flow regulating valve comprises a flow regulating valve structure and a slide valve structure for automatic flow restriction control. In the controllable constant flow regulating lift valve, axial thrust acting on the spindle of a lift valve type flow regulating valve structure is balanced such that the constant flow regulating lift valve can be operated for constant flow regulation by a very small power. When the flow regulating valve structure and/or the slide valve structure are clogged with soil, sand and dirt, the internal pressure changes to open the clogged valve for automatic cleaning operation so that the soil, sand and dirt are washed away. This constant flow regulating lift valve is suitably applicable to a variety of industrial fields.

2 Claims, 3 Drawing Sheets

CONTROLLABLE CONSTANT FLOW REGULATING LIFT VALVE

TECHNICAL FIELD

The present invention relates to a direct-acting controllable constant flow regulating lift valve, namely, a controllable constant flow regulating lift valve without pilot valve, to be installed in a liquid transportation line, provided with an automatic flow restriction regulating passage, capable of operating on the basis of a working force derived from dynamic parameters of the working fluid, such as the valve-inlet pressure, the valve-outlet pressure and the variation of the outlet liquid level, said lift valve having valve members so associated that the axial thrust acting on the spindle is balanced to reduce valve operating power to the least extent, said lift valve being capable of being easily fabricated regardless of its dimensions. The present invention also relates to a valve having a self-cleaning function to avoid the deposition of soil, sand and dirt that may obstruct the operation of the valve.

In this specification, "water" is the general term for liquids.

BACKGROUND ART

Conventional valves, such as butterfly valves and gate valves, are not encountered by troubles when used as simple shut-off valves. However, when used for regulating flow rate under severe conditions, such as conditions for transporting high-pressure water, the conventional valves of this type are liable to generate drift currents and turbulence because the conventional valves, in general, have an irregular valve opening, and such drift currents and turbulence are liable to generate large noise and intense vibrations, to induce impulses, to cause rapid corrosion and breakage of the main component parts of the valves. On the other hand, lift valves are less liable to generate drift currents and turbulence because lift valves have a regular valve opening. However, the lift valves once closed are difficult to open due to unbalanced action of pressure on the valve element and the lift valves are unable to function properly if due attention is not paid. Therefore, it has been a usual practice to use a double-seated lift valve in which the axial thrust acting on the valve element is balanced or to use a single-seated valve having a spindle integrally provided with a balancing piston which reduces the axial thrust that acts on the valve element.

Nevertheless, the conventional lift valves still have many problems. As mentioned above, an axial thrust reducing means for a high-pressure lift valve or a large lift valve is complex and increases the manufacturing costs of the lift valve significantly, and it is very difficult to control flow rate in a pipe in which pressure varies violently. In lift valves, as well as in valves of other types, troubles due to the deposition of soil, sand and dirt are liable to occur when the lift valves are adjusted to low flow rate and these troubles are difficult problems to solve.

Accordingly, it is an object of the present invention to provide an easy-to-use controllable variable flow regulating lift valve solving those problems of the conventional lift valves, capable of exerting stable flow regulating performance, requiring very small power for valve operation, and provided with a flow regulating valve means and an automatic flow restriction means capable of an automatic cleaning function to avoid clogging.

DISCLOSURE OF THE INVENTION

The present invention pertains to a valve in the technical field of direct-acting controllable constant flow regulating valves. The present invention is applied to a lift valve having a regular passage least liable to generate violent turbulent currents or drift currents during flow regulating operation, and comprising, as principal components, a variable flow regulating valve element, a slide valve element for automatic flow restriction, and a valve body having an inlet passage, a flow damping chamber (middle chamber) and an output passage arranged in that order along the direction of flow.

The flow regulating valve element and the slide valve element come into contact with each other immediately before the flow passage is shut off to balance the axial thrusts. Consequently, the flow regulating valve element can be operated for flow rate adjustment by a very small power. Accordingly, when the controllable constant flow regulating lift valve of the present invention is used for liquid level control or the like, a small liquid level regulating float device may be employed, and the flow rate can be regulated in a linear relation with the variation of the liquid level.

In the controllable constant flow regulating lift valve of the present invention, the flow regulating valve is disposed so as to form a backward slide clearance so that the flow regulating valve element, similarly to a slide valve, can be lifted up from the valve seat when clogging occurs for self-cleaning by the pressure of the fluid to avoid troubles attributable to clogging. Therefore, the controllable constant flow regulating lift valve of the present invention is effectively applicable to facilities that handle filthy liquids.

BEST MODES FOR CARRYING OUT THE INVENTION

Figure 1:
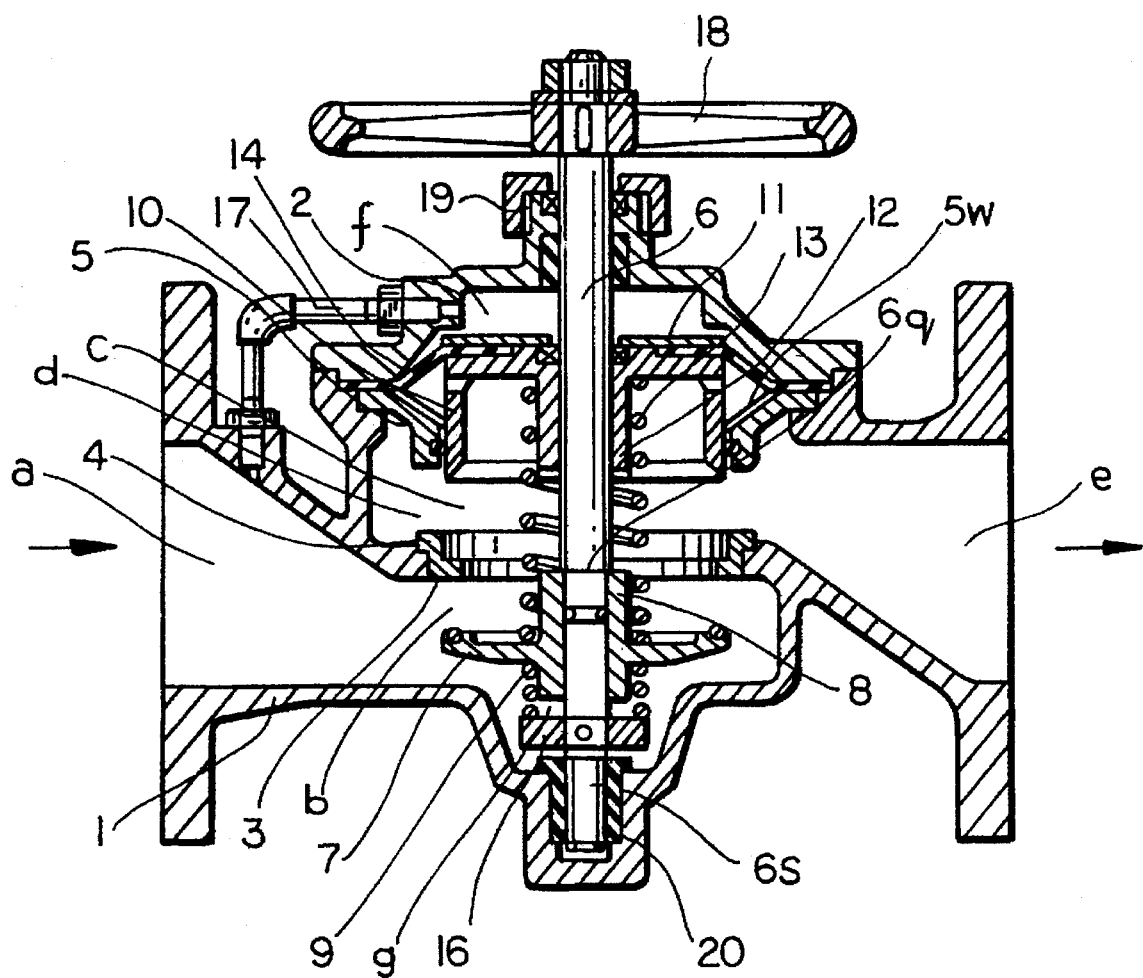
FIG. 1 is a sectional view of a controllable constant flow regulating lift valve of a first embodiment according to the present invention.

The present invention will be described in detail with reference to the accompanying drawings. Referring to FIG. 1, a valve body 1 has an inlet passage a and an outlet passage e, and is provided with a bonnet 2. The valve body 1 has a flow regulating valve opening b formed between a flow regulating valve seat 3 and a flow regulating valve element 7 disposed opposite to the flow regulating valve seat 3. In the valve body 1 is formed a slide valve opening d between a slide valve seat 4 and a slide valve element 10 disposed opposite to the slide valve seat 4. A flow damping chamber c is formed between the valve openings b and d.

Thus, the interior of the valve body 1 is divided into the inlet passage, the flow damping chamber and the outlet passage in that order along the direction of flow of the fluid by the flow regulating valve element and the slide valve element, and the flow is restricted at the flow regulating valve opening b and the slide valve opening d.

A sealed chamber f defined by the end wall 11 of the slide valve element and the bonnet 2 is sealed with a sealing member 14, and communicates with the inlet passage a by means of a connecting pipe 17. A balancing spring 13 is disposed so as to form an automatic restriction regulating passage in the slide valve opening d. The flow regulating valve element 7 is axially slidably fitted on a spindle 6 in a water-tight fashion so that a backward slide clearance g is formed, and is pressed against a shoulder 6*q* of the spindle 6 with a flow regulating valve spring 9.

Fundamentally, the flow regulating valve element 7 and the end wall 11 of the slide valve element are substantially equal to each other in pressure receiving area, but the pressure receiving area of the end wall 11 of the slide valve element is slightly greater than that of the flow regulating valve element 7. A boss 8 of the flow regulating valve element comes in contact with a boss 12 of the slide valve element when the flow regulating valve element 7 is substantially seated on the flow regulating valve seat 3 and the flow rate is virtually zero. Upon the contact of the boss 8 of the flow regulating valve element with the boss 12 of the slide valve element, valve-inlet pressures acting respectively on the corresponding pressure receiving surfaces of the flow regulating valve element and the slide valve element substantially balance with each other. Therefore, the controllable constant flow regulating lift valve requires a very small valve operating power for the entire valve opening and closing stroke owing to the balanced action of the valve-inlet pressures acting on the respective pressure receiving surfaces of the flow regulating valve element and the slide valve element combined with a very small force acting on the spindle during the flow regulating operation.

Referring to FIG. 1, when the flow regulating valve element 7 is at its fully open position, the fluid flows from the inlet passage a through the flow regulating valve opening b, the flow damping chamber c and the slide valve opening d in that order into the outlet passage e. In this state, the force of the balancing spring 13 acting to open the slide valve opening d is balanced with the difference between the pressures acting on the front and the back side of the end wall 11 of the slide valve element, i.e., between the pressure in the chamber f equal to the pressure in the inlet passage a, and the pressure in the flow damping chamber c. Naturally, this pressure difference is created due to the resistance of the passage of the flow regulating valve opening b.

When the flow regulating valve element 7 is moved toward the valve seat 3 for flow regulation, the resistance of the valve opening b increases, the pressure in the flow damping chamber c decreases accordingly, and the balance established by the balancing spring 13 is lost, so that the slide valve element 10 moves automatically toward the slide valve seat 4 to a position where the passage is adjusted to an opening corresponding to a desired flow rate and the slide valve element 10 is held stable at the position. In this state, the unbalanced pressure acting toward the downstream side, i.e., acting upward as viewed in FIG. 1, on the flow regulating valve element 7 corresponds to the slight resistance of the passage in the flow regulating valve opening b, whose effect on the operation of the spindle 6 is negligible.

When the flow regulating valve opening is almost closed or fully closed with the flow regulating valve element 7, the pressure in the flow damping chamber c decreases nearly to the valve-outlet pressure, and the boss 8 of the flow regulating valve element is in contact with the boss 12 of the slide valve element, whereby as mentioned above, the axial thrusts are balanced. Thus, the controllable constant flow regulating lift valve requires only a slight power for operating the spindle throughout the stroke.

The flow regulating valve opening b of the constant flow regulating lift valve of the present invention becomes narrow when adjusted for a small flow rate. Then, the pressure in the flow damping chamber c drops instantaneously when the flow regulating valve opening b is clogged with soil, sand and dirt and, consequently, the slide valve element 10 moves downward to depress the flow regulating valve element 7 by a distance in a range corresponding to the backward slide clearance g to enlarge the flow regulating valve opening b in order that the soil, sand and dirt clogging the flow regulating valve opening b are washed away therefrom. When the slide valve opening d is clogged, the pressure in the flow damping chamber c rises instantaneously to lift up the slide valve element 10 and, consequently, the soil, sand and dirt clogging the slide valve opening d are washed away therefrom.

There are various possible methods of operating the flow regulating valve element 7 for closing and opening the same. The constant flow regulating lift valve shown in FIG. 1 is of an inside screw type, in which the spindle has a threaded portion 6*s* screwed in a bearing 20. When the spindle 6 is rotated by turning a handle 18, the flow regulating valve element 7 is raised or lowered. Indicated at 5*w* is a support plate for preventing the sealing member 14 from being caused to adhere to a partition wall 5 by high pressure or for any reason.

The spindle 6 may be supported on the valve body on the side opposite the side on which the bonnet 2 is disposed, without fitting the slide valve element 10 on the spindle 6. This modification does not affect the operation of the controllable constant flow regulating lift valve of the present invention.

Figure 2:
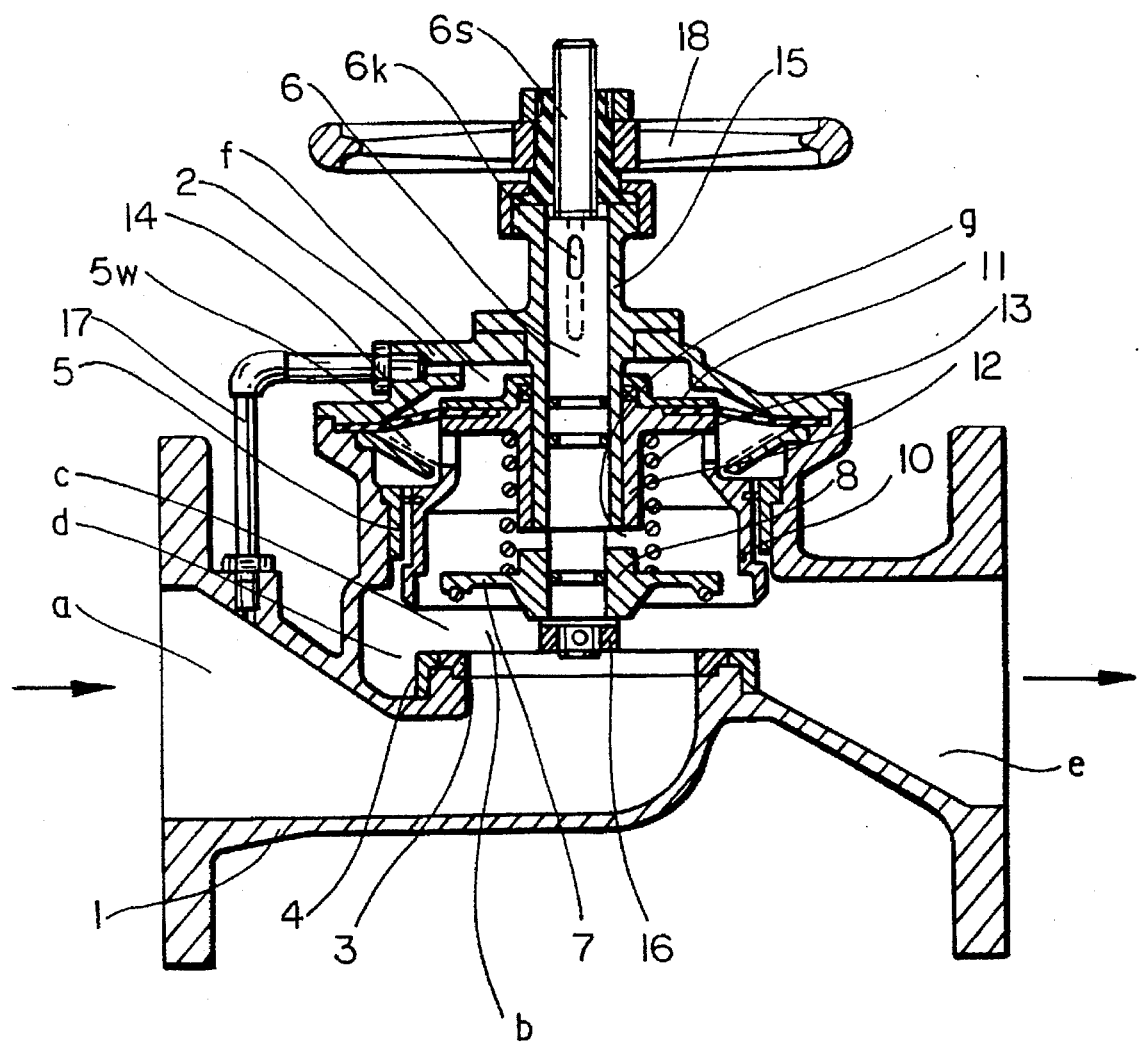
FIG. 2 is a sectional view of a controllable constant flow regulating lift valve of a second embodiment according to the present invention.

FIG. 2 shows a controllable constant flow regulating lift valve according to a second embodiment of the present invention. The constant flow regulating valve of the second embodiment is substantially the same in construction as the constant flow regulating lift valve of the first embodiment, except that a flow regulating valve element 7 is disposed behind a valve seat 3 with respect to the direction of flow of the liquid. A flow damping chamber c is formed between a flow regulating valve opening b and a slide valve opening d. The function and effect of the constant flow regulating lift valve of the second embodiment are substantially the same as those of the constant flow regulating lift valve of the first embodiment.

In the second embodiment, a flow regulating valve element 7 is mounted on a spindle 6 supported by a valve element supporting member 15 and is pressed against a nut 16 on the spindle by a balancing spring 13 so that a backward slide clearance g is formed.

Fundamentally, the flow regulating valve element 7 and an end wall 11 of a slide valve element are substantially equal to each other in pressure receiving area. Actually, the pressure receiving area of the flow regulating valve element 7 is slightly greater than that of the end wall 11. Therefore, the boss 8 of the flow regulating valve element and the boss 12 of the slide valve element come into contact with each other to balance axial thrusts when the flow regulating valve element 7 is moved nearly to its closing position. When the flow regulating valve opening b is clogged, the pressure in the flow damping chamber c drops instantaneously, so that the flow regulating valve element 7 is lifted up and matters clogging the flow regulating valve opening b can be washed away.

The controllable constant flow regulating lift valve shown in FIG. 2 is of an outside screw type, in which the spindle 6 is provided with a key way 6*k* for restraining the spindle 6 from rotation, and a handle 18 is screwed on the threaded portion 6*s*. The handle 18 is turned to raise and lower the flow regulating valve element 7 for opening and closing operation.

Figure 3:
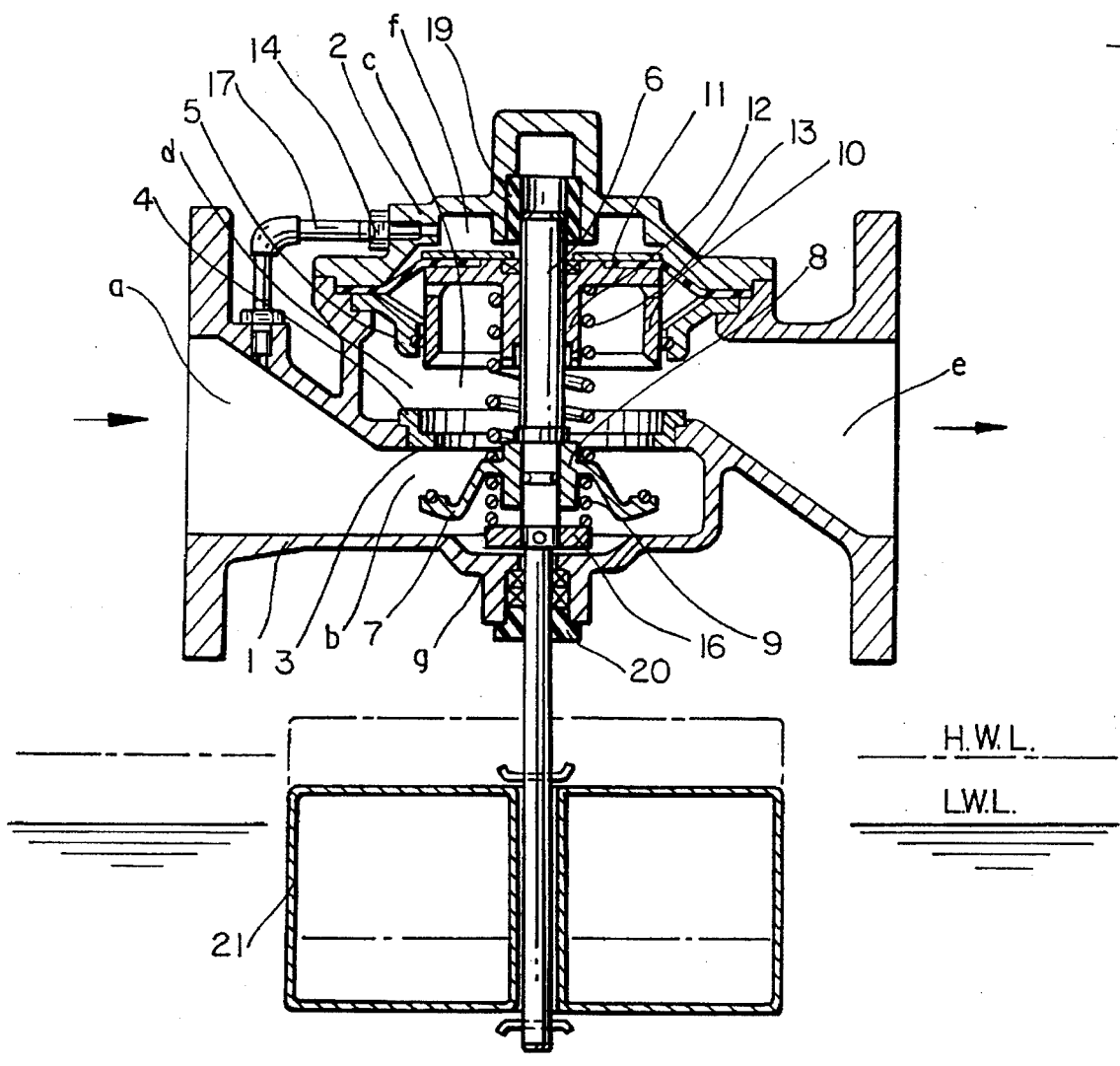
FIG. 3 is a sectional view of the valve used for liquid level control.

FIG. 3 shows the controllable constant flow regulating lift valve as used for a liquid level control. The spindle 6 of the constant flow regulating lift valve is moved by a float 21. Although the operation of the controllable constant flow regulating lift valve in this use is substantially the same as that of the controllable constant flow regulating lift valve described with reference to FIG. 1, the liquid is discharged very moderately even if the valve-inlet pressure prevailing in the inlet passage is high because the flow rate varies linearly with the liquid level, so that the liquid is not supplied excessively.

Although the float 21 is connected directly to the spindle 6 in this embodiment, naturally, the float 21 may be connected to the spindle 6 by any one of various conventional methods employing connecting members or levers.

Although the present invention has been described in connection with the preferred embodiments shown in FIGS. 1 to 3, the controllable constant flow regulating lift valve may be disposed with the spindle extended in a lateral position, the sealing member may be an O ring, an oil seal, a diaphragm or a bellophragm, and changes and variations may be made therein without departing from the scope thereof.

INDUSTRIAL APPLICABILITY

The present invention makes good use of the advantages of the conventional lift valves that hardly generate violent turbulence and violent drift currents, incorporates improvements into the direct-acting valve so that the axial thrusts are balanced to reduce the power necessary for operating the direct-acting valve to the least possible extent. The present invention solves the problems in the conventional lift valves to provide a lift valve that can be formed with large dimensions and can be formed in a construction applicable to handling high-pressure liquid. The controllable constant flow regulating lift valve of the present invention has an excellent constant flow regulating characteristic, can be driven for operation by the power of a large variety of power sources including the buoyancy of a float and a solar power generating system that generates only weak power. Since the controllable constant flow regulating lift valve of the present invention is capable of preventing troubles attributable to the clogging of the valve opening, the constant flow regulating lift valve of the present invention is applicable to uses in various industrial fields including the field of agricultural irrigation and the field of civil engineering drainage.

We claim:

1. A controllable constant flow regulating lift valve having flow regulating valve means formed on an upstream side (inlet side) of the valve, sliding valve means provided for automatic flow restriction regulating operation and formed on a downstream side (outlet side) of the valve, and a flow damping chamber (c) defined between the flow regulating valve means and the slide valve means; said controllable constant flow regulating lift valve comprising:

a partition wall (5) of a valve body (1); a slide valve element (10) slidably fitted in the partition wall (5) with a sealing member (14) attached to the slide valve element (10) for sealing; a valve seat member (4) disposed opposite to the slide valve element (10) so as to form a slide valve opening (d) between the valve seat member (4) and the slide valve element (10); a valve spindle (6); a flow regulating valve element (7); a balancing spring (13) extended between an end wall (11) of the slide valve element (10) and the flow regulating valve element (7) in parallel to the spindle (6) and exerting a predetermined force for expanding the valve opening (d); a sealed chamber (f) formed between the end wall (11) and a valve bonnet (2) and connected to the inlet side (a) via a connecting passage (17), the pressure receiving area of the flow regulating valve element (7) and that of the end wall (11) being substantially equal to each other, a boss (8) of the flow regulating valve element (7) and a boss (12) of the slide valve element (10) being formed so as to come into contact with each other when the flow regulating valve element (7) is almost seated on a valve seat (3) formed on the valve seat member (4), and the flow regulating valve element (7) being supported so as to be able to be moved away from the valve seat (3) by variation of the pressure in the flow damping chamber (c).

2. A controllable constant flow regulating lift valve according to claim 1, wherein a float is connected to the spindle to drive the spindle.

* * * * *